2,986,576
Patented May 30, 1961

2,986,576
LONG CHAIN ALKYLBENZENE DIISOCYANATES

Giovanni A. Bonetti, Wilmington, Del., and Vincent J. Keenan, Ardmore, Pa., assignors to The Atlantic Refining Company, Philadelphia, Pa., a corporation of Pennsylvania No Drawing. Filed Feb. 6, 1958, Ser. No. 713,544

4 Claims. (Cl. 260—453)

This invention relates to novel alkylbenzene diisocyanates and to improvements in the method of producing alkylbenzene diisocyanates. More particularly this invention relates to novel alkylbenzene diisocyanates in which the alkyl group attached to the benzene nucleus contains from 9 to 24 carbon atoms and may be either straight or branched in chain structure and to a method of producing diisocyanates from the corresponding alkylbenzene diamines.

The novel compounds of the present invention have the following general formula:

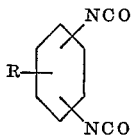

wherein R is an alkyl group which may be either straight or branched in chain structure and contains from 9 to 24 carbon atoms.

These alkylbenzene diisocyanates are prepared as will be described herein from the corresponding dinitroalkylbenzenes which compounds and the preparation thereof are disclosed in the application of Giovanni A. Bonetti filed of even date herewith entitled "Dinitrated Aromatic Compounds and Method for Their Production," Serial No. 713,572, now United States Patent No. 2,934,571.

The alkylbenzene diisocyanates of this invention may be prepared from the corresponding dinitroalkylbenzenes by a variety of methods similar to those disclosed in the prior art with respect to the preparation of low molecular weight or short chain (up to six carbons) alkylbenzene diisocyanates with certain modifications which constitute an important part of this invention. These modifications are important because they prevent the polymerization of the alkylbenzene diisocyanates during their manufacture.

Heretofore organic alkylbenzene mono-, di- and poly-isocyanates having a maximum of six carbon atoms in the alkyl chain have been produced in the liquid phase by reacting phosgene with the corresponding alkylbenzene mono-, di- or poly-primary amines or amine hydrochlorides to form the corresponding carbamyl chlorides which are then converted into isocyanates by treatment with a tertiary amine or by thermal decomposition.

For example, one liquid phase method which has been employed involved reacting primary amines with hydrogen chloride to form the corresponding salt, treating this salt while in the molten state with phosgene to produce the carbamyl chloride, and then dehydrochlorinating the latter to yield the corresponding isocyanate. As an improvement to the foregoing method it has been proposed to pass phosgene over the molten hydrochloride salt at a rate sufficient to remove hydrogen chloride as rapidly as it is formed in the reaction and thereby produce the isocyanate directly.

Another liquid phase method which has been practiced comprises adding hydrogen chloride to a solution of the corresponding amine in organic solvents such as ortho-dichlorobenzene or trichlorobenzene and then treating the resulting slurry of amine hydrochloride at a temperature of 130° C. to 180° C. with phosgene to convert it into the corresponding isocyanate.

To avoid having to prepare separately the hydrochloride salt as in the above manner a modified procedure has been practiced which involves adding a solution of the amine in orthodichlorobenzene, trichlorobenzene or similar solvent to a same solvent solution of excess phosgene at —5° C. to 50° C. The slurry of the carbamyl chloride thus obtained is then heated to 130° C. to 180° C. and decomposed to convert the carbamyl chlorides into the corresponding diisocyanates. At the end of the reaction a stream of an inert gas is passed through the solution in order to remove excess hydrogen chloride and unreacted phosgene. The instant invention is concerned with improvements to this method of preparing alkylbenzene diisocyanates.

It is, therefore, an object of the present invention to provide new and useful high molecular weight, long chain, alkylbenzene diisocyanates.

It is a further object of this invention to provide novel alkylbenzene diisocyanates having 9 to 24 carbon atoms in the alkyl group.

It is a further object of this invention to provide novel alkylbenzene diisocyanates having from 9 to 24 carbon atoms in the alkyl group which may be either straight or highly branched in chain structure.

It is a further object of this invention to provide a method of producing alkylbenzene diisocyanates which method will prevent their polymerization during their manufacture.

As stated above, a preferred starting material for the preparation of the novel alkylbenzene diisocyanates of this invention is a dinitroalkylbenzene in which the alkyl radical attached to the benzene nucleus contains from 9 to 24 carbon atoms and which alkyl radical is either normal or branched in chain structure. These dinitrolkylbenzenes are prepared by reacting an alkylbenzene with a mixture of fuming nitric acid and fuming sulfuric acid.

It has been found that two nitro radicals may be introduced simultaneously into the nucleus of an alkylbenzene through the use of fuming nitric acid and fuming sulfuric acid as a nitrating medium. This reaction is substantially instantaneous, i.e. the reaction is similar in speed to the speed of an ionic reaction. It has been found also that the nitrating action is temperature independent over a wide temperature range. This nitration reaction also should be conducted under substantially anhydrous conditions.

The fuming nitric acid is nitric acid of specific gravity of at least 1.49 and includes the so-called 100 percent nitric acid and "red fuming" nitric acid.

The fuming sulfuric acid is preferably sulfuric acid containing from 0.25 mols to 0.287 mols of free $SO_3$ per 100 grams of solution, known commercially as 20 percent to 23 percent oleum, although oleums of higher or lower $SO_3$ content may be employed. Only those oleums, however, which have a specific gravity of at least 1.85 contain sufficient free $SO_3$ to be practical.

The simultaneous introduction of two nitro radicals into the nucleus of an alkylbenzene is accomplished by using a nitrating mixture composed of 2.1 to 8.0 mols of fuming nitric acid (calculated as $HNO_3$) and 0.5 to 8.0 mols of free $SO_3$ as contained in the fuming sulfuric acid per mol of alkylbenzene. Since the order of addition is immaterial the same ratios of fuming nitric acid and fuming sulfuric acid may be added to the alkylbenzene instead of the hydrocarbon to the acid mixture.

As mentioned above, this dinitration may be carried out over a wide temperature range, i.e. from —50° C. to 60° C. At temperatures above 60° C. trinitration reactions are favored and accordingly temperatures greater than 60° C. are to be avoided. Dinitration can be accomplished at temperatures as low as —50° C. and below, although at temperatures below about —50° C. the dinitrated product tends to crystallize out from the reaction mixture. The heterogeneous mixture thus formed prevents thorough mixing of the reactants with the result that it becomes difficult to prevent the formation of local overheating or "hot spots."

Anhydrous conditions for the dinitration reaction are obtained by the use of fuming sulfuric acid. The free $SO_3$ contained therein reacts with any residual water or water of reaction thus insuring the complete removal of all water in the reaction.

As stated hereinbefore, all that is necessary to produce the desired dinitroalkylbenzenes is to mix thoroughly the alkylbenzene, the fuming nitric acid and the fuming sulfuric acid under the conditions above stated. Immediately after mixing the reactants, the reaction is complete and the reaction mass is poured onto crushed ice or into cold water. Two distinct phases are formed—one an aqueous acid phase and the other a syrupy yellowish organic phase. This organic phase may be extracted with a suitable solvent such as benzene and washed with water to remove any residual acid; washed with a dilute aqueous solution of an alkaline material such as NaOH; washed with water until neutral and further purified by standard methods such as vacuum distillation.

In a specific embodiment of this invention a dinitro alkylbenzene wherein the alkyl group contains from 9 to 24 carbon atoms produced as described above is converted to the novel alkylbenzene diisocyanates of the present invention by first reducing the dinitro compound to the corresponding diamine. This reduction may be accomplished either by the use of hydrogen under high pressures and catalysts such as platinum dioxide, platinum, alumina, or similar hydrogenation catalysts, or by an atmospheric pressure liquid phase reduction using a powdered iron-mineral acid system.

As was pointed out above in the preparation of diisocyanates from the diamines in a liquid phase five steps are required in the methods used by workers in this field. In the first step a solution of diamine in a high boiling organic solvent such as ortho-dichlorobenzene was added to an ortho-dichlorobenzene solution of phosgene at a temperature from about —5° C. to about 50° C. In the second step the carbamyl chloride formed in the first step was converted to the diisocyanate by thermal decomposition at temperatures of from 130° C. to 180° C. until the evolution of HCl (formed by the reaction) ceased. In the third step an inert gas such as nitrogen was used to sweep or strip out the unreacted phosgene and HCl from the solution of the diisocyanate. In the fourth step the solution of the diisocyanate was again heated to distill off the solvent and in the fifth step the diisocyanate residue was distilled under reduced pressure to produce the pure diisocyanate.

The disadvantages associated with this series of steps in the preparation of diisocyanates are long reaction times and high temperatures which favor the polymerization of part of the diisocyanates. With the method of the instant invention short reaction times and lower temperatures may be used such that there is no polymerization of the diisocyanates. This method involves the use of ethyl acetate as the solvent for the diamine and for the phosgene and under such conditions the number of steps is reduced.

In the first step the ethyl acetate solution of the diamine is added to an ethyl acetate solution of the phosgene at temperatures of from —5° C. to 50° C. In the second step the ethyl acetate is distilled from the carbamyl chloride produced in the first step. This step combines steps 2, 3 and 4 of the prior method since during the distillation of the ethyl acetate the carbamyl chloride is converted to the diisocyanate and the hydrogen chloride produced by the reaction together with excess phosgene are removed overhead with the solvent. The temperatures reached during the distillation will range from an overpoint only slightly above 50° C. up to an endpoint of about 78° C. at which time only traces of ethyl acetate remain in the diisocyanate product. The third and last step is one of distilling the diisocyanate under reduced pressures ranging from about 0.3 mm. to about 10 mm. of mercury to produce the pure material.

It will be noted that the reaction time is extremely short in this process and that very moderate temperatures are employed. In no case has it been found that the diisocyanates polymerize when this process is used, whereas when the prior art five step process was employed with the attendant long reaction times and high temperatures large amounts of dimers and higher polymers of the diisocyanates were formed.

The amount of ethyl acetate required to dissolve the diamine and phosgene will depend upon the particular alkylbenzene diamine which forms the starting material and the temperature at which the diamine and phosgene are dissolved. In all cases, however, there should be at least a 50 to 100 percent by volume excess of the ethyl acetate over that required merely to dissolve the reactants. This amount of excess will prevent the polymerization of the diisocyanate produced by the decomposition of the carbamyl chloride. In other words, it prevents a too concentrated solution of diisocyanate during the critical time when it is being formed.

The amount of phosgene should be 0.5 to 5.0 percent by weight in excess of the stoichiometrical amount since a deficiency will promote the formation of disubstituted ureas instead of the diisocyanates.

The method of this invention is applicable to the production of the lower molecular weight alkylbenzene diisocyanates as well as the higher molecular weight alkylbenzene diisocyanates. It is particularly useful in the production of the lower molecular weight compounds since these polymerize most readily while its advantage in the case of the high molecular weight compounds lies in the fact that the diamines are more readily soluble in the ethyl acetate than in the solvents previously used in the production of diisocyanates and in addition, of course, the instant method also prevents the polymerization of the high molecular weight compounds.

The following examples will serve to illustrate the preparation of the novel high molecular weight diisocyanates in this invention.

*Example I*

In order to prepare an amine intermediate, 170 grams (0.58 mols) of dinitrononylbenzene, 224 grams (4.0 mols) of iron powder, and 250 cc. of 50 percent by weight aqueous ethanol were introduced into a three-necked flask provided with stirrer, dropping funnel, and two reflux condensers. The mixture was brought to boiling and 12 cc. of concentrated hydrochloric acid in 75 cc. of 50 percent aqueous ethanol was added very slowly keeping the mixture boiling. After the addition of the hydrochloric acid the reaction mixture was refluxed for two hours, then made alkaline with a concentrated alcoholic solution of potassium hydroxide. The iron was filtered off and washed with two 50 cc. portions of 95 percent ethanol. The diamine thus produced was extracted with benzene. The benzene solution was dried by the use of magnesium sulfate and distilled. There was obtained 63 grams of diamino-nonyl benzene boiling between 172° C. and 180° C. at 3 mm. mercury.

*Example II*

The 63 grams of diamino-nonyl benzene (0.269 mols) produced in Example I were dissolved in 200 cc. of ethyl acetate and introduced into 300 cc. of ethyl acetate saturated with phosgene at 5°–10° C. with vigorous agitation.

A slow stream of phosgene was introduced into the mixture throughout the reaction to insure an excess of this reactant. When the addition was completed, the ethyl acetate was distilled off as fast as possible at normal pressure and the residue vacuum distilled. There was obtained 55 grams (71.5 percent of the theory) of nonylbenzene-diisocyanate boiling between 162° C. and 169° C. at 3.5 mm. mercury, which compound was further identified by elemental analysis and typical reactions of diisocyanates.

*Example III*

A 100 gram portion of dinitro-octadecylbenzene was dissolved in 100 grams of dioxane and contacted with hydrogen at a pressure of from 60–65 pounds per square inch in a low pressure hydrogenation apparatus, in the presence of one gram of platinum oxide, $PtO_2$, as the catalyst. The introduction of the hydrogen was continued until it was no longer absorbed. The catalyst was filtered from the hydrogenated product, the dioxane stripped from the product, and the diamine distilled under reduced pressure. The diamino-octadecylbenzene product thus obtained had a boiling range of from 227° C. to 235° C. at 0.9 mm. of mercury pressure.

*Example IV*

A 50 gram portion (0.139 mols) of the diamino-octadecylbenzene produced in Example III was dissolved in 100 cc. of ethyl acetate and added with constant stirring to a solution of 80 grams of phosgene (0.808 mols) in 100 cc. of ethyl acetate which solution had been cooled to 0° C. The temperature was maintained at between 0° C. and 5° C. and a slow stream of phosgene was bubbled through the mixture throughout the entire time of addition. Upon completion of the addition of the diamino-octadecylbenzene the ethyl acetate was stripped from the product at normal pressure and the diisocyanate recovered by distillation under reduced pressure. The octadecylbenzene-diisocyanate thus obtained had a boiling range of from 236° C. to 240° C. at 2.6 mm. of mercury pressure. The compound was identified by elemental analysis and typical diisocyanate reactions.

*Example V*

A 105 gram portion of dinitro-dodecylbenzene (0.313 mols) was dissolved in 100 cc. of dioxane and contacted with hydrogen at a pressure of from 60 to 70 pounds per square inch in a low pressure hydrogenation apparatus, in the presence of one gram of platinum oxide, $PtO_2$, as the catalyst. The reaction was essentially completed in three hours, during which time the temperature rose to 75° C. to 80° C. At the end of this time, an additional 0.2 grams of catalyst was added and hydrogenation continued for an additional hour. The catalyst was filtered from the hydrogenated product, the dioxane stripped from the product, and the diamine product recovered by distillation under reduced pressure. Approximately 73 grams (85 percent yield) of diamino-dodecylbenzene was thus obtained, which product boiled between 165° C. and 175° C. at 1.5 mm. mercury pressure.

*Example VI*

A 180 gram portion of diamino-dodecylbenzene (0.65 mols) produced as described in Example V was dissolved in 200 cc. of ethyl acetate and introduced with constant stirring into a solution of phosgene prepared by dissolving 148.5 grams (1.5 mols) of phosgene in 300 cc. of ethyl acetate. Throughout the addition the temperature was maintained from 0° C. to 10° C. and a slow stream of phosgene was bubbled through the reactants. Upon completion of the addition of the diamine to the phosgene, the ethyl acetate was stripped from the diisocyanate product at normal pressure and the diisocyanate recovered by distillation under reduced pressure. There was obtained 180 grams (85 percent yield) of dodecylbenzene-diisocyanate which had a boiling range of 159° C. to 168° C. at 0.9 mm. mercury pressure. The dodecylbenzenediisocyanate was identified by elemental analysis and by typical diisocyanate reactions.

*Example VII*

A sample of 2,4-dinitro-tert-butylbenzene was converted to the corresponding diamine by the low pressure hydrogenation method shown in Example V.

One liter of dry ethyl acetate was placed in a three-necked flask fitted with a mechanical stirrer, dropping funnel, gas inlet tube and a distilling head. There was dissolved 257 grams of phosgene (2.6 mols) in the ethyl acetate and the solution was then cooled down to around 0° C. A 194 gram portion (1.18 mols) of the 2,4-diamino-tert-butylbenzene was dissolved in 1300 cc. of dry ethyl acetate and this solution was slowly introduced with constant stitrring into the phosgene solution contained in the flask while the temperature was held from 0° C. to about 5° C. When the addition was completed after approximately 1½ hours the ethyl acetate was distilled off at normal pressure until only traces of the ethyl acetate remained in the diisocyanate product contained in the flask. The tert-butylbenzene diisocyanate was distilled under a pressure of 8 mm. of mercury. It had a boiling range between 138° C. and 140° C. at this pressure. There were produced 220 grams of product corresponding to a yield of 85.5 percent of the theoretical yield based on the diamine.

This experiment demonstrates that the process of the instant invention is applicable to the production of the lower molecular weight alkylbenzene diisocyanates and that, therefore, such process may be applied to the production of alkylbenzene diisocyanates wherein the alkyl radical may range between 1 and 24 carbon atoms.

The novel high molecular weight diisocyanates of this invention have particular utility in the field of polymer chemistry. Some polymer types prepared from these novel compounds include the polyureas and polyurethanes as well as adhesives and synthetic rubbers.

The polyurea type polymers have been prepared by condensing the high molecular weight alkylbenzene diisocyanates with urea.

Polyurethanes or foam plastics have also been prepared from these novel compounds by condensing alkylbenzene diisocyanates of this invention with polyesters and polyglycols.

Polyurethane adhesives have been prepared from these novel compounds by reacting the novel diisocyanates of this invention with a polyether, i.e., Carbowax (a polyethylene glycol manufactured commercially by the carbon and Carbide Company).

Synthetic rubbers have also been prepared from these novel compounds by reacting an excess of the diisocyanate with a polyether and crosslinking the resulting polymer with a diamine to produce the synthetic rubber.

These novel high molecular weight alkylbenzene diisocyanates have similar utility in the field of other types of plastics such as coating compositions and solid plastics.

We claim:

1. Alkylbenzene diisocyanates of the general formula:

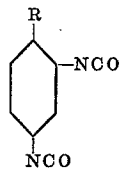

wherein R is an alkyl group having 9 to 24 carbon atoms.
2. Nonylbenzene 2,4-diisocyanate.
3. Dodecylbenzene 2,4-diisocyanate.
4. Octadecylbenzene 2,4-diisocyanate.

(References on following page)

References Cited in the file of this patent

UNITED STATES PATENTS

| | | |
|---|---|---|
| 2,671,082 | Stallmann | Mar. 2, 1954 |
| 2,680,130 | Flores | June 1, 1954 |
| 2,680,730 | Martin | June 8, 1954 |
| 2,683,144 | Balon | July 6, 1954 |
| 2,757,185 | Barthel | July 31, 1956 |
| 2,904,535 | Mika | Sept. 15, 1959 |

FOREIGN PATENTS

| | | |
|---|---|---|
| 483,308 | Great Britain | Apr. 14, 1938 |

OTHER REFERENCES

Shriner et al.: "Organic Synthesis," Collective Volume 2 (edited by Blatt), 1943, pages 453–454.

Siefkin: Justus Liebig's Annalen der Chemie, volume 562 (1949), page 127.